3,551,453
OXADITHIAADAMANTANOLES AND PROCESS
FOR THEIR MANUFACTURE
Kjell P. Olsson and Sven-Olof O. Almqvist, Uppsala,
Sweden, assignors to Pharmacia AB, Uppsala, Sweden,
a company of Sweden
No Drawing. Filed Feb. 23, 1968, Ser. No. 707,443
Claims priority, application Sweden, Feb. 28, 1967,
2,740
Int. Cl. A61k 27/00; C07d 79/00
U.S. Cl. 260—327         5 Claims

ABSTRACT OF THE DISCLOSURE

Novel oxadithiaadamantanoles having the general formula:

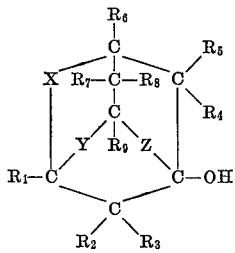

wherein $R_1$–$R_9$ are each a member selected from the group consisting of hydrogen and lower alkyl and X; Y; and Z are each a member selected from the group consisting of oxygen and sulfur, one of the symbols being oxygen and the remaining two sulfur atoms, and their method of preparation are provided. A particular example of the above compounds is an isomer mixture of DL-3,5,7-trimethyl - 2-oxa - 4,6-dithia-1-adamantanol, DL-3,5,7-trimethyl - 4 - oxa - 2,6 - dithia-1-adamantanol and DL-3,5,7 - trimethyl - 6 - oxa - 2,4-dithia-1-adamantanol. The novel compounds are preferably to be used for the preparation of drugs.

---

The present invention concerns novel oxadithiaadamantanoles of the general Formula I:

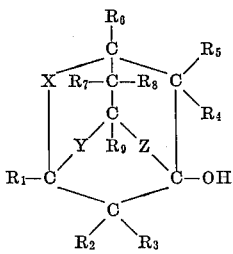

wherein $R_1$–$R_9$ are hydrogen or lower alkyl and X; Y; and Z are each oxygen or sulfur, one of the symbols being oxygen and the remaining being sulfur atoms.

The invention also encompasses a process for the preparation of the above novel compounds. According to this process a compound of the Formula II:

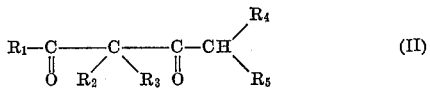

wherein $R_1$–$R_5$ have each the above significance, or a reactive derivative thereof and a compound of the Formula III:

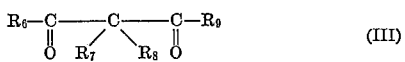

wherein $R_6$–$R_9$ have each the above significance, or a reactive derivative thereof are reacted with hydrogen sulfide in a strongly acid, preferably aqueous, solution.

Compounds and mixtures of compounds of the Formula I have proved valuable biological properties, it being especially mentioned that they act upon the central nervous system. They are thus potential psychodrugs and hypnotherapeutical agents. They also are potential agents against viruses.

The following table shows the general anesthetic effect of the substances of the example on mouse, guinea pigs and rats.

| Animal species | Dose mg./kg. | Number of animals Total | Number of animals Showing anesthesia | Duration oa anesthesia in mins |
|---|---|---|---|---|
| Mouse | 200 | 18 | 14 | 25±6 |
|  | 300 | 13 | 11 | 51±14 |
| Guinea pig | 50 | 5 | 2 | 12 |
|  | 100 | 5 | 5 | 36±12 |
|  | 200 | 4 | 4 | 62±14 |
| Rat | 100 | 6 | 6 | 39±6 |
|  | 200 | 6 | 6 | 105±23 |
|  | 300 | 6 | 6 | 142 |

The reaction according to the invention can be carried out within a broad range of temperature. Thus it can be carried at temperatures in the range of from 20 to 100° C. Preferably there is, however, chosen a temperature within a narrower range of from 30 to 60° C.

The process compounds are usually a mixture of isomeric compounds of the Formula I in which one of the symbols X; Y; and Z is oxygen and the remaining each sulfur. The isomeric mixture can be separated into its individual ingredients.

The novel compounds are preferably to be used for the preparation of drugs. For this purpose, they are mixed with carriers usually used for this purpose such as starch, magnesium stearate etc. and the mixture as formed is converted into a dosage unit of administration such as tablets and capsules. Such a dosage unit may contain from 5 to 1000 mg., preferably from 10 to 500 mg., of the active substance. It is also possible to transform the active substance into solutions, dispersions etc. in a manner known in the art.

EXAMPLE

Isomer mixture of DL-3,5,7-trimethyl-2-oxa-4,6-dithia-1-adamantanol, DL - 3,5,7 - trimethyl-4-oxa-2,6-dithia-1-adamantanol and DL-3,5,7-trimethyl-6-oxa-2,4-dithia-1-adamantanol A newly prepared solution of 100 g. of 2,4-pentandione in 400 g. of conc. hydrochloric acid is heated to 30° C. Hydrogen sulfide is introduced with vigorous agitation. Hereby, the temperature rises rapidly to 45° and then sets slowly. After about 10 min. a precipitate begins to form. The colour of the reaction mixture is then changed from yellow to dark brown. After 4 hours when little or no more hydrogen sulfide is absorbed, 150 g. of ice are added. The precipitate formed is filtered off, washed carefully with water, and recrystallized from about 150 ml. of methanol. The product obtained is of no interest.

The aqueous filtrate is combined with the washing water and extracted with 3×70 ml. of chloroform. The extract is washed with 200 ml. of water and combined with the methanol-containing mother liquor. The solvents are removed in a rotation evaporator. The dark residue is recrystallized from 100 ml. of gasoline (boiling point interval 85–110° C.). The obtained light grey product having the melting point 136–137° C. weighs 20.5 g. when in dried form and represents the desired isomer mixture.

*Result of analysis.*—Calc. for $C_{10}H_{16}O_2S_2$ (percent): C, 51.69; H, 6.94; S, 27.60, M.W. (mass spectrum) 232. Found (percent): C, 51.67; H, 6.95; S, 27.59, M.W. (mass spectrum) 232.

IR-spectrum indicates the presence of —OH but absence of —SH; C=O; and C=C, NMR-spectrum indicates one OH-group, three $CH_2$- and three $CH_3$-groups.

What we claim is:

1. An isomeric mixture of DL-3,5,7-trimethyl-2-oxa-4,6-dithia-1-adamantanol, DL - 3,5,7-trimethyl-4-oxa-2,6-dithia-1-adamantanol and DL-3,5,7-trimethyl-6-oxa-2,4-dithia-1-adamantanol.

2. The isomeric mixture of claim 6 which has a melting point of 136–137° C.

3. A method for the preparation of an isomeric mixture of DL-3,5,7 - trimethyl-2-oxa-4,6-dithia-1-adamantanol, DL-3,5,7-trimethyl-4-oxa - 2,6 - dithia - 1 - adamantanol and DL - 3,5,7 - trimethyl - 6 - oxa-2,4-dithia-1-adamantanol which comprises reacting 2,4 pentandione with hydrogen sulfide in a strongly acid, aqueous solution wherein said acid is a protonic acid.

4. A method according to claim 3 wherein the protonic acid is hydrochloric acid.

5. A method according to claim 3 wherein a temperature from 30 to 60° C. is employed.

References Cited
UNITED STATES PATENTS

| | | | |
|---|---|---|---|
| 3,284,444 | 11/1966 | Franz | 260—239 |
| 3,365,465 | 1/1968 | Greenbaum | 260—327 |
| 3,396,162 | 8/1968 | Bell | 260—240 |

HENRY R. JILES, Primary Examiner

C. M. SHURKO, Assistant Examiner

U.S. Cl. X.R.

424—277